Nov. 24, 1970 R. J. STEFANIAK ET AL 3,541,640
KNOCKOUT APPARATUS FOR BLOW MOLD
Filed March 18, 1968 4 Sheets-Sheet 1

INVENTORS
RUDOLPH J. STEFANIAK
CHARLES J. CHEBUHAR
BY George E. Szekely
ATT'Y.

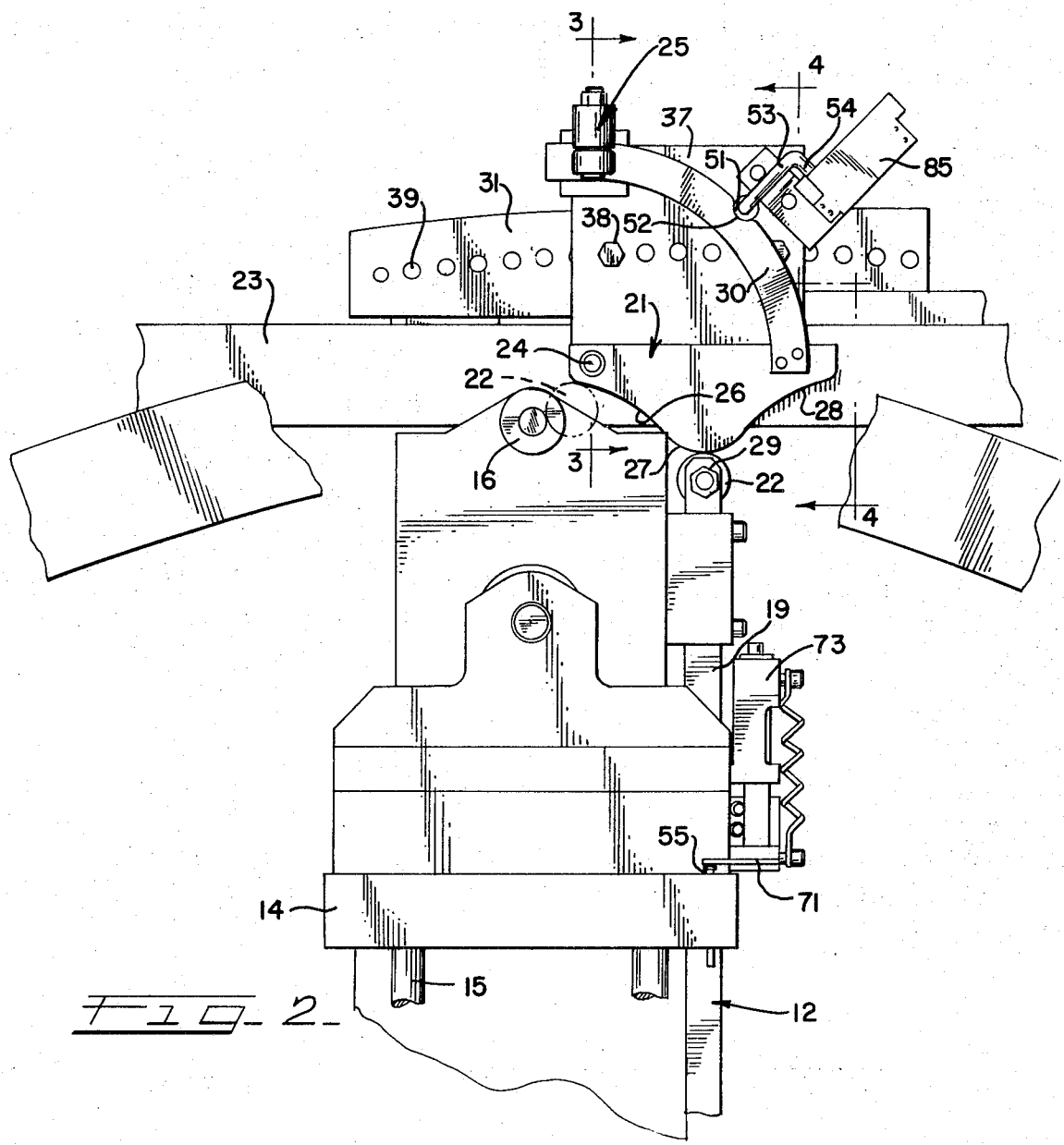

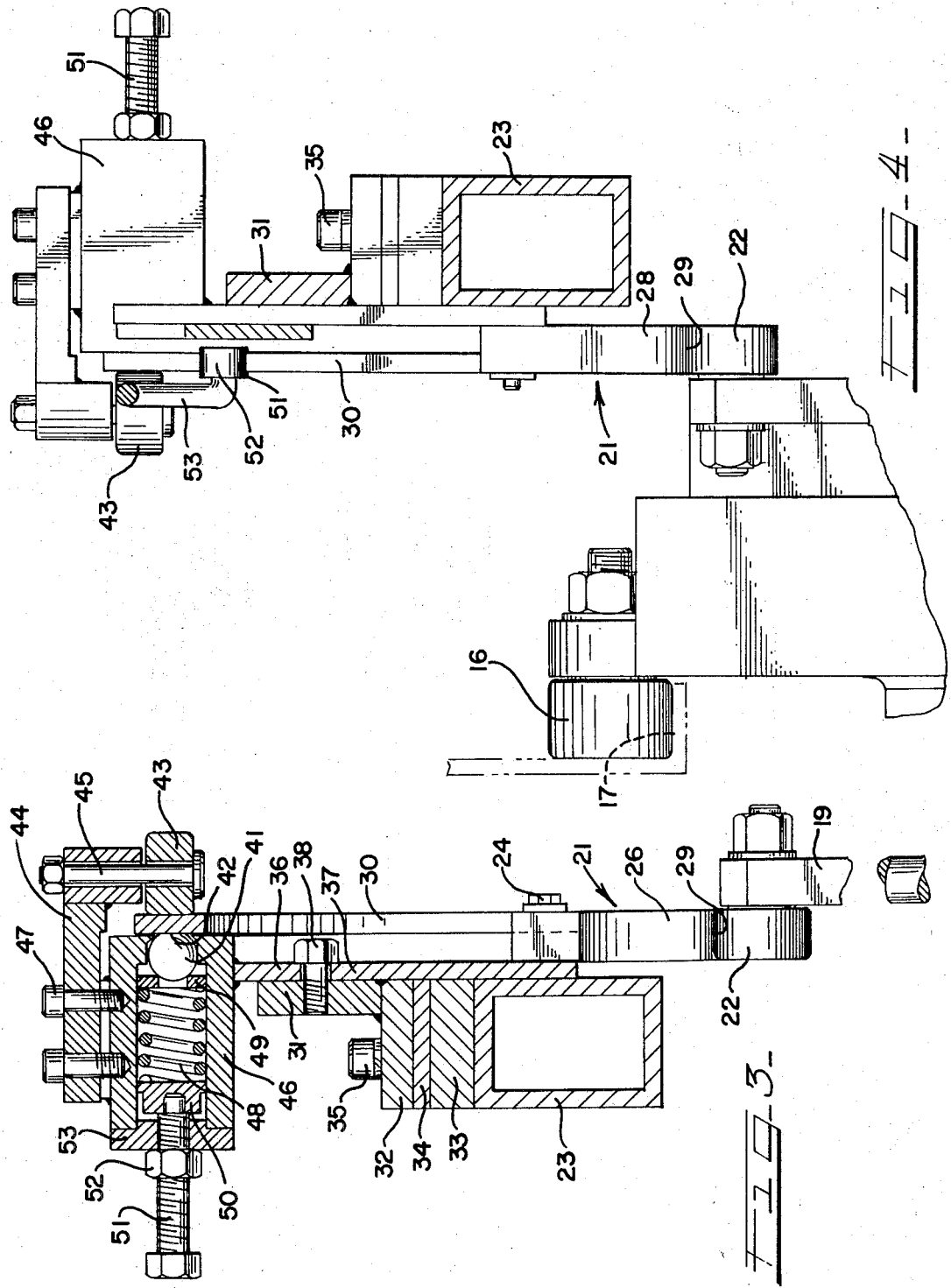

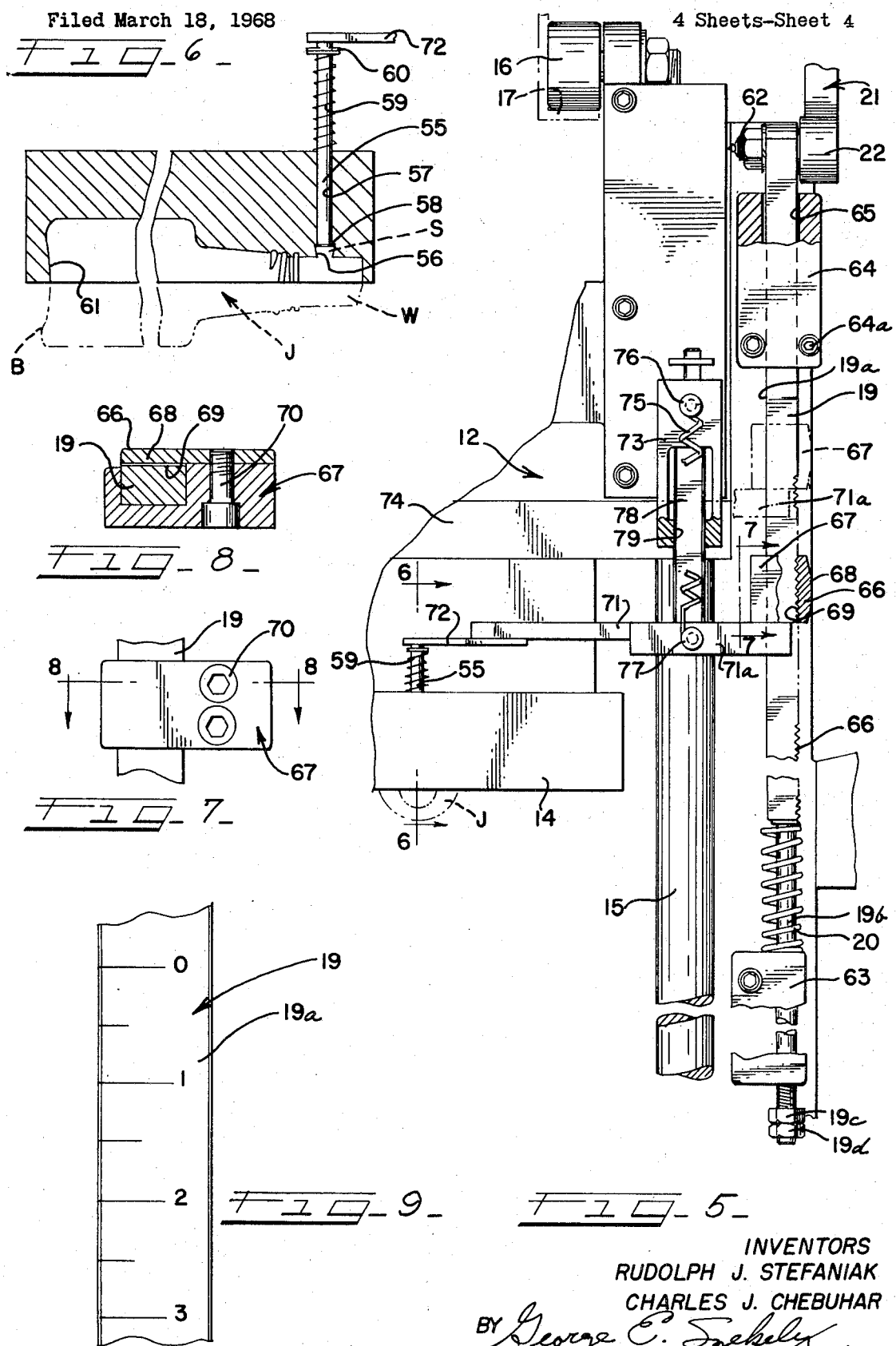

United States Patent Office 3,541,640
Patented Nov. 24, 1970

3,541,640
KNOCKOUT APPARATUS FOR BLOW MOLD
Rudolph J. Stefaniak, Munster, Ind., and Charles J. Chebuhar, Chicago, Ill., assignors to Continental Can Company, Inc., New York, N.Y., a corporation of New York
Filed Mar. 18, 1968, Ser. No. 713,693
Int. Cl. B29c 5/06
U.S. Cl. 18—5                                            17 Claims

ABSTRACT OF THE DISCLOSURE

Apparatus for automatically ejecting an article from a rotary blow mold, operating independently of mold opening motion. A knockout cam at the ejection station controls operation of a knockout bar carried by the mold arm. The knockout bar actuates an ejector pin in the mold half carrying the article. If knockout force exceeds a predetermined safe value, the cam releases, actuating a safety trip mechanism to stop the machine.

BACKGROUND OF THE INVENTION

Field of the invention

This invention relates to article knockout mechanism for plastic molding machines, more particularly for a vertical rotary blow molding machine such as that shown and described in U.S. Pat. 2,784,452, issued to Herbert S. Ruekberg and John L. Szajna, Mar. 12, 1957. The invention is not limited to use in the particular machine there shown and described, but is adaptable to substantially any molding machine in which moving molds are to be automatically opened during traverse in a continuous molding cycle.

The prior art

Molded plastic articles, such as blow-molded bottles, are generally held in the molds with substantial resistance to removal therefrom. This is particularly true when the article is still warm at knockout, as in the case of articles produced on continuous molding machines. In automatic or semi-automatic molding machines, it has heretofore been the practice to provide a knockout pin or the like in that mold half which retains the article upon separation of the molds, a representative such arrangement being shown in the aforesaid Ruekberg and Szajna patent. In that arrangement, the article lies in the inner mold half while the outer mold half is moved away, the moving mold half assembly carrying a rod which trips an ejector pin in the fixed mold half, freeing the article. Since the fixed mold half is substantially horizontal at the time of ejection and the ejection force exerted by the slow moving mold half is generally insufficient to propel the article from the mold, the article will usually have to be removed from the mold by hand after being freed by the ejection mechanism.

In order fully to automate article ejection and delivery from the machine, the article is preferably carried by one mold half in a position from which the article can fall into a suitable hopper, chute or conveyor carrier. To insure against premature dropping of the article during the mold separation, as may be the case with an article not fully fast to the mold, it is desirable to provide positive engagement of the article with the carrier mold half, as by small plug attached to the article, engaging a mold recess, such excess plug subsequently being removed in the usual trimming or deflashing process. It will then require a substantial ejection force applied at just the correct discharge position to free the article so that it can drop out, especially with articles of substantial size and weight. It has been found that knockout mechanisms depending upon opening mold motion for impetus cannot practicably provide consistent, timely knockout.

Mold assemblies for the large articles often made are necessarily quite heavy. In usual operation, the mold must be opened substantially in advance of the knockout position. In the vertical rotary type of machine particularly concerned here, the heavy half mold assembly is suspended at knockout position with the entire weight carried on the cam. Cam lift acceleration counter to the weight of the mold assembly imposes unduly heavy loads on the cam track, follower and mold carriage assembly, as is true also of any impact or force multiplier mechanism which might be devised to utilize mold motion for knockout impetus. The cost, complexity, space requirements, and hazards involved with schemes depending on mold opening motions for article knockout impetus are such as to render the schemes generally impractical. Prior to this invention, no fully practicable automatic knockout mechanism has been devised for molding machines of the general type indicated.

SUMMARY OF THE INVENTION

It is a principal object of this invention to provide a plastic molding machine with a dependable automatic article knockout.

It is another object of this invention to provide a molded article knockout which is operable independently of mold opening motion.

It is yet another object of this invention to provide an article knockout for a vertical rotary blow molding machine which may be calibrated for maximum safe load on the knockout train and to provide for actuation of a safety stop upon overload.

It is still a further object of this invention to provide in a molded article knockout mechanism a knockout bar with a simple adjustment to accommodate molds of various sizes and constructions, with various positions of ejection levers, the bar being calibrated to facilitate resetting the knockout mechanism when changing from one mold assembly to another.

A knockout bar, slidably mounted on the mold arm, carries an adjustable block in position to oppose a knockout lever suspended from the mold carriage. As the revolving arm approaches the ejection station along the track of the opening cam, a follower on the knockout bar engages the knockout cam mounted on the machine frame. The knockout cam is profiled to impel the bar rapidly toward the knockout lever, opposing an article ejection pin, thereby rapping the pin and knocking the article from the mold half. The knockout cam is pivotally supported and biased toward camming position under predetermined load. If the article fails to eject under the maximum safe load corresponding to the cam bias, the cam retracts, tripping a limit switch to stop the machine. The knockout block is adjustable along the rod, calibrated for quick adjustment to accommodate mold assemblies of various sizes with various positions of the knockout lever relative to the knockout cam.

Other objects and advantages of this invention will be apparent upon reading the ensuing description together with the accompanying drawings.

BRIEF DESCRIPTION OF THE DRAWINGS

FIG. 2 is an enlarged elevation similar to FIG. 1, showing the portion thereof including a mold wheel arm at knockout position and showing the knockout apparatus in greater detail;

FIG. 3 is a section on line 3—3 of FIG. 2, showing details of the knockout cam and cam plate;

FIG. 4 is a partial side elevation on line 4—4 of FIG. 2, showing other details of the knockout cam arrangement and the safety stop mechanism;

FIG. 5 is a fragmentary section of the knockout mold half, taken on line 5—5 of FIG. 1;

FIG. 6 is a fragmentary elevation taken on line 6—6 of FIG. 5;

FIG. 7 is a detail of the knockout actuator, as viewed on line 7—7 of FIG. 5;

FIG. 8 is a section on line 8—8 of FIG. 7; and

FIG. 9 is a fragmentary detail of the knockout bar, showing graduation thereof.

FIG. 1 shows the general arrangement of a vertical rotary blow molding machine, as adapted to incorporate the novel knockout apparatus of this invention. As here shown, the apparatus is arranged to effect knockout of the article vertically downward, this being the arrangement most convenient and satisfactory for automatic operation, wherein the ejected article falls straight down by its own weight and is most conveniently caught in a delivery chute, hopper, or other collection or transport device.

Figure 1:
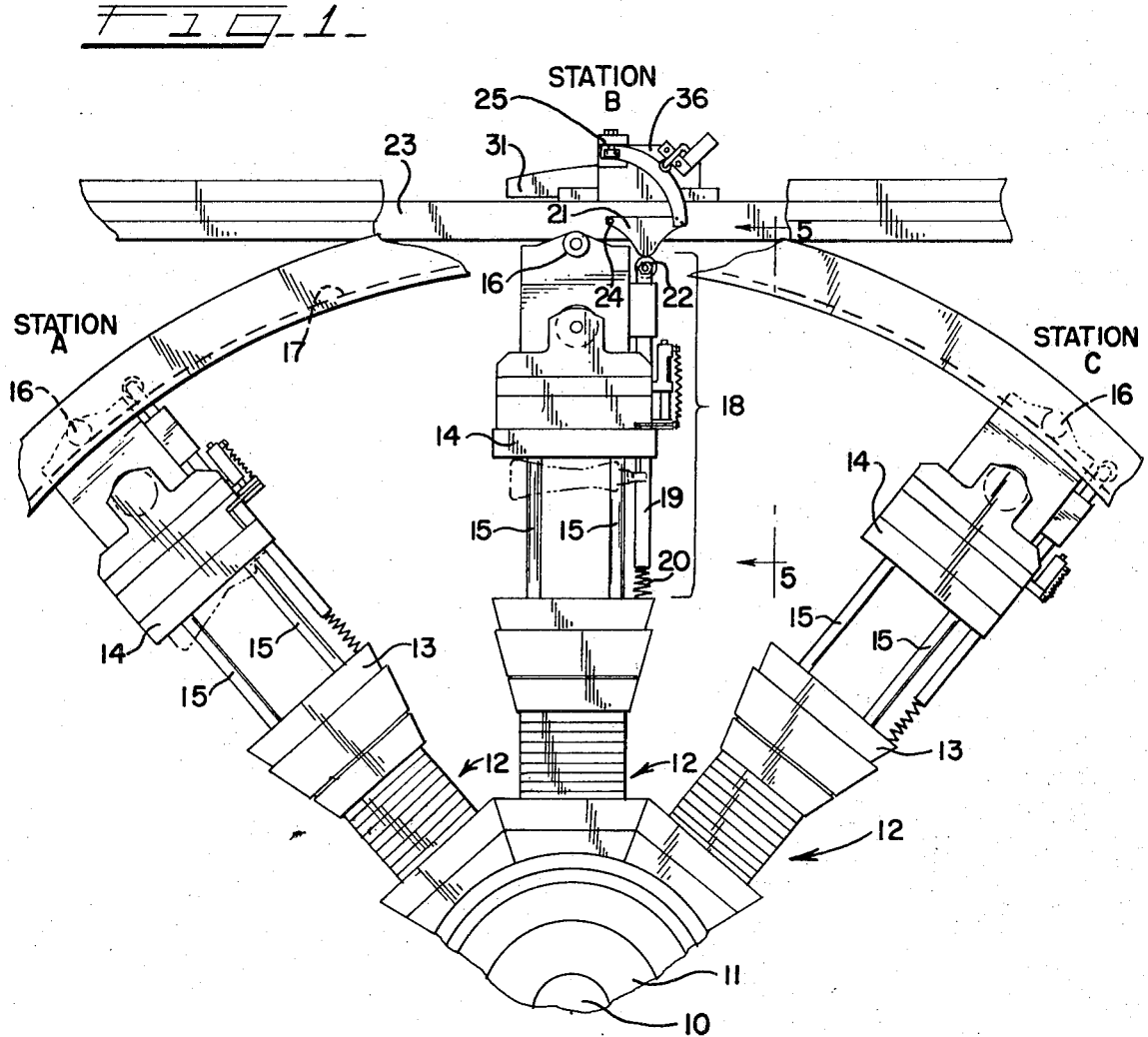
FIG. 1 is a partially schematic, fragmentary front elevation of a rotary blow molding machine incorporating knockout apparatus according to this invention, showing three stations, including the article-ejection station.

One of the salient features of plastic molding is that hollow articles may be produced in configurations involving substantial undercuts of the mold cavity, the inherent flexibility of such plastic articles generally permitting them to be removed from the mold without providing cores or retractable cavity inserts. However, substantial force may be required to effect ejection, if the article is held to the mold by a retaining lug, under cut, or the like. In the usual case, convenience and economy require that ejection force be applied to an accessible portion of the article in a limited area. Obviously, it will be necessary to effect ejection in such a manner as to avoid damage to the article, which by its general nature and condition is rather fragile and readily deformable. Thus, it is desirable to effect ejection under carefully controlled conditions, preferably with a substantial element of impact, in order to assure freeing of the article from the mold at the captive portions, without damaging the article.

The general structure of the machine here shown for purposes of illustration is described in detail in the aforesaid Ruekberg and Szajna Pat. 2,784,452. Shaft 10 carries a wheel hub 11, to which are affixed a plurality of arms 12. Each arm 12 carries a mold assembly consisting of a fixed half 13 and a radially movable half 14, the latter being outermost along the arm.

Three Stations A, B, and C are here shown in open-mold positions of the molding cycle, the wheel as here viewed traveling in the clockwise direction. Thus, Station A is in the early part of the open-dwell, Station B is at mid-stage, corresponding to knockout position, with arm 12 upward, and Station C is in the dwell stage subsequent to article ejection. Outer mold half 14, arranged to slide on guide rods 15, is held open during this stage by virtue of an associated follower 16 traveling the open-dwell cam track 17.

A knockout assembly 18 is provided on each arm 12, generally at the side thereof. The purpose of knockout assemblage 18 is to effect ejection of a molded Article J from the outer mold half 14, in which the Article J is releasably held by any suitable means whereby the Article J is constrained to move with mold half 14 as the mold is opened, one arrangement of which is shown and described hereafter.

At Station A, the molded Article J is captive in outer mold half 14. At Station B, Article J is fully ejected from mold half 14, this result being accomplished by the depression of knockout bar 19 against the outward bias of spring 20. Actuation is effected by cam plate 21 bearing against roller 22 on the outer end of rod 19, cam plate 21 being carried on machine frame member 23 in position to engage roller 22 as arm 12 rotates and traverses the upper arc of cam track 17.

Inasmuch as malfunction in the molding, or in the knockout assemblage 18, may result in failure of ejection or a dangerous high resistance to knockout actuation, cam plate 21 is pivotally supported on frame member 23 by means of pin 24 and is yieldably held in camming position by virtue of an associated safety release assembly 25.

The arrangement and construction of the actuating cam and safety release assembly are best seen in FIGS. 2–4 inclusive. Referring particularly to FIG. 2, cam 21 has a rapid advance track 26, opposing roller 22 upon its approach from the left, as here viewed. The profile of track 26 is preferably a simple harmonic curve blending to a relatively short-radius, terminal rise along surface 27, then continuing to a rapid retract track 28, which is substantially the reverse of track 26, the peak 29 being substantially at mid-point of the cam traverse.

Cam plate 21 is restrained against pivotal movement about pin 24 by means of curved arm 30 affixed to plate 21 at the track terminus, remote from pin 24. The cam retention and release portion of the safety release assembly 25 is best seen in FIGS. 2 and 3. The release assembly 25 is supported on a mounting bracket 31. Inasmuch as frame member 23 here is a relatively light, rectangular-tube section, adequate bearing and rigidity are best provided by flanging bracket 31, as at 32, and providing a substantial support block 33 resting on frame member 23. Shim elements 34 provide vertical adjustment, the whole being demountably assembled, as by cap screws 35. Mounting block 33 is affixed to member 23 in any suitable manner, as by welding. Support plate 36 is clamped against bracket face 37 by means of cap screws 38. Cam positions other than those here shown may be required, angularly of the wheel traverse, to accommodate various mold assemblies, article discharge provisions, and similar variations associated with production of a variety of articles on the particular machine. As best seen in FIG. 2, angular position adjustment is provided by an arcuate series of mounting taps 39, for reception of clamping screws 38.

Referring particularly to FIG. 3, cam plate 21 is normally restrained against pivotal movement by virtue of attached arm 30 engaging detent ball 41, for which purpose a dimple 42 is provided in the upper end of arm 30. Engagement is maintained against any tendency of arm 30 to twist or bend by roller 43 bearing on the outer face of arm 30, directly opposite ball 41. Roller 43 is suspended from a block 44 by means of shaft bolt 45. Block 44 is clamped to detent housing 46 by means of cap screws 47, housing 46 being welded to plate 36.

The detent mechanism is calibrated and adjusted to resist disengagement with such force as corresponds to the torque resultant upon maximum safe thrust on rod 19, imposed on plate 21 at point 29 by pressure of follower 22. Bias of the desired value is provided by spring 48 acting against ball 41 through bearing washer 49. Spring 48 is held at selected precompression by follower 50 and set screw 51, adjustment being locked by nut 52 bearing on cap 53.

Referring particularly to FIGS. 2 and 4, safety stop apparatus associated with the cam release mechanism precludes operation continuing after the occurrence of a malfunction overloading the knockout and thereby tripping the release. Notch 51 in arm 30 cradles roller 52, journalled on rocker arm 53. Arm 53 engages actuator 54 of limit switch 85, which constitutes an element in the control circuitry for the mold wheel drive. Should a knockout overload occur, torque on cam plate 21 and arm 30 will exceed the detent bias, as above described, whereupon arm 30 rotates. In such case, the notch 51 cams roller 52 outwardly, thereby actuating switch 85 through the rocking action of arm 53 against actuator 54. Limit switch 85 may be any of the types well known in the control art, although in the arrangement shown, a rocker type is preferred for the sake of simplicity, safety, and dependability. Switch 85 may be connected in control circuitry in any suitable manner, as well known in the motor and drive control art, for example to energize a magnetic brake and motor disconnect, whereby to bring the machine to a substantially instantaneous stop. Suitable such braking, disconnecting and throwout devices being well understood and readily available commercially, detailed description is not necessary here.

The knockout assemblage 18 operates to transmit motion imparted by cam plate 21 to eject the article from the mold. Referring now particularly to FIGS. 5 and 6, cam plate 21 is substantially offset from the vertical bounds of mold 14, the mold carriage structure associated with mold 14 and arm 12 being such as to preclude a practical arrangement for direct linear actuation from above mold 14. A vertical ejector pin 55 in mold 14 operates in a manner best understood by reference to the mold section of FIG. 6. The mold cavity and article configuration here shown are representative of those usually involved in blow molding.

The most suitable and effective location on the article at which to impress mechanical ejection force is along the neck flash W, which is not only the most resistant to distortion, but is intended to be trimmed subsequently, not forming part of the finished article. Accordingly, provision for positive capture in mold half 14 is made by undercutting the mold cavity with a shallow, reversely tapered bore 56, in communication with the cavity portion around article portion W. When Article J is blown, a small lug S is formed in undercut 56. Pin 55 is slidable in hole 57, drilled through to communicate with the undercut bore 56, which is slightly larger than hole 57, to accommodate head 58. The pin 55 is inserted from below when the mold part 14 is assembled. A light compression spring 59, bearing on washer/cotter unit 60 biases pin 55 to its retracted position. Pushing or rapping pin 55 ejects the Article J, the sprue S being sufficiently deformable to be freed from undercut 56. Leverage resulting from locating pin 55 near the neck end of the mold is useful in stripping the article from mold half 14. This is particularly true in the representative example, wherein the externally concave bottom B must be freed from the undercut mold surface 61. Aided by inherent flexibility of the Article J, the stripping can be accomplished without article damage.

The apparatus for pushing or rapping pin 55 is best described by again referring particularly to FIG. 5. Roller 22 is journaled on shaft 62, extending through the upper end of the knockout bar 19. Compression spring 20, resting on block 63, biases knockout bar 19 toward cam plate 21, the bar 19 being held in its true vertical position by guide block 64, whose elongated slot 65 fits bar 19 closely, thus insuring alignment of follower 22 with cam plate 21, also obviating bending of bar 19 under the combined columnar and cantilever loads exerted when plate 21 bears on the follower 22.

Since a given mold wheel is designed to accommodate a wide variety of mold assemblies for various articles, involving substantial variation in the position and depth of mold half 14 along arm 12, it is necessary to provide position adjustment in the knockout assembly. For this purpose, bar 19 is provided with serrations 66 for a substantial distance along one face. An actuator dog comprises a body 67 and cap 68, forming a yoke which is clamped on bar 19 in any desired position, teeth 69 of clamp 68 engaging serrations 66 for positive engagement in selected position. FIGS. 7 and 8 show the clamping arrangement, wherein manipulation of screws 70 serves to clamp or free actuator 67, for positioning movement along bar 19.

Actuator 67 opposes transfer lever 71 whose arm 72, remote from actuator 67, opposes ejector pin 55. Lever 71 is carried with mold half 14 in suspension from block 73, affixed to an adapter plate 74, which constitutes part of the carriage assembly moving with mold half 14 along guide rods 15. Lever 71 is suspended on extension spring 75, which is anchored to block 73 by pin 76 and to lever 71 by pin 77.

Satisfactory repetitive operation requires that the ejection stroke be maintained at all times truly vertical along the axis of pin 55. Guide pin 78, whose square body closely fits ways 79 of block 73, extends downward, and is affixed to the thickened body 71a of lever 71, whereby to maintain bar 71 level at all times, notwithstanding load and support imbalance under influence of actuator 67, spring 75, and pin 55. The square guide arrangement prevents rotation of lever 71 about the axis of suspension.

OPERATION

To ready the knock out assembly, the retract position of bar 19 is first checked to insure that follower 22 is at the correct radius to strike cam plate 21 at the track approach, as indicated by the broken line representation of the follower in FIG. 2. Such minor adjustment as may be required can be made by means of the stop and jam nuts 19c and 19d, FIG. 5. With a given arm 12 at the approach position, the actuator 67, FIG. 5, is positioned and clamped to rest upon, or to be slightly spaced from, the opposed face of lever block 71a, in the fully retracted position of lever 71 and ejector pin 55. The mold wheel may be jogged to check the knockout stroke as follower 22 traverses cam 21, and then continue with checking other arms of the wheel. Functioning of the safety release apparatus can be checked by interposing a calibrated test spring in the knockout train, for example, under lever 71, the test load being selected by correspondence to imposed predetermined maximum thrust of follower 22 against cam plate 21. Setting of the detent spring 48, FIG. 3, can then be made such that the detent ball 41 trips under the test loading.

In service, mold wheel arms 12, rotating clockwise, as viewed in FIG. 1, carry the respective molds 13, 14 successively past knockout cam 21. As each arm 12 approaches the position of Station B, follower 22 engages cam track 26, at the upper end of knockout bar 19. Entry shock is absorbed by spring 20, supporting bar 19. As follower 22 traverses track 26 toward apex 29, bar 19 is propelled rapidly downward, depressing lever 71, which pushes down against pin 55 (FIG. 2), ejecting the article from mold half 14. After the knockout stroke, spring 20 urges bar 19 upward, with follower 22 riding along track 28, controlling retraction of bar 19. The retraction stroke is limited by stop nut 19c striking block 63.

The reaction force of follower 22 against cam 21 tends to pivot cam 21 counter-clockwise about pin 24, against the restraint of detent ball 41, engaging arm 30 at dimple 42 (FIG. 3). Should knockout reaction force exceed predetermined safe value corresponding to the detent bias, the arm 30 will be released, allowing cam 21 to pivot. Thereupon, arm notch 51 cams roller 52 and actuator rocker arm 53, tripping switch 85, thereby stopping the machine. The malfunction can then be corrected, the cam, detent and limit switch reset, and the machine restored to operation.

The foregoing description of a preferred embodiment of the invention will enable those skilled in the art to devise adaptations or modifications within the spirit and scope of the appended claims, which define the invention.

What is claimed is:

1. Article knockout apparatus for a molding machine having a frame, an openable mold arranged for movement relative to said frame, means for holding said mold open during a predetermined stage in course of said movement, and an article ejector associated with said mold, said apparatus comprising: a knockout cam supported on said frame, and knockout means carried with said mold in position to actuate said ejector, said knockout means being aranged for association with said cam during said predetermined stage, so as to actuate said ejector and thereby eject an article from said mold in the course of said movement while said mold is open, said cam being movable relative to said frame, and releasably held in camming position thereon.

2. Knockout apparatus according to claim 1, said cam being pivotally mounted upon said frame, and having a track, said knockout means including a follower arranged to bear upon said track, said cam being held in a normal camming position with predetermined bias opposing follower bearing force against said cam; and a limit switch having trip actuator means opposing pivoting of said cam away from said normal camming position, whereby knockout resistance exceeding a value corresponding to said bias causes said cam to pivot in a direction to trip said switch.

3. Knockout apparatus according to claim 2, wherein said cam is releasably held and biased to camming position by a detent.

4. Knockout apparatus according to claim 3, wherein said cam carries a trip arm opposing said switch actuator in position to trip said switch when said cam releases by overriding said detent.

5. Knockout apparatus according to claim 1, wherein said ejector comprises a reciprocable pin aranged for bearing against a portion of said article, said knockout means including a lever opposing said pin and a reciprocable bar opposing said lever in position for actuating said pin to eject said article, said knocktout means including a follower traversing a track of said cam, said cam track being profiled to drive said rod towards said lever as said follower traverses said track, thereby ejecting said article from said mold.

6. Knockout apparatus according to claim 5, wherein said bar is yieldably biased to retracted position in a direction towards said cam.

7. Knockout apparatus according to claim 6, wherein said cam is releasably held in camming position relative to said follower.

8. Knockout apparatus according to claim 6, wherein said track profile includes a rapid advance portion in traverse of said follower toward knockout position of said bar, said bar being spaced from said lever when in said retracted position.

9. A rotary molding machine with automatic article knockout apparatus, comprising: a frame; a mold wheel rotatable relative to said frame, said wheel having a plurality of arms; a split mold on each said arm, an outer part of each said mold being outwardly movable along said arm to open said mold; a radial opening cam carried on said frame, said opening cam and said outer mold part being associated to hold said mold open during a predetermined stage in the course of rotation; article ejection means carried by said mold part, said mold part being constructed for releasable retention of an article when said mold is open; a knockout cam releasably held by said frame in camming traverse position relative to said arms; and knockout means carried by each said arm in operative association with said ejection means, said knockout means including a follower arranged for traversing said knockout cam during said predetermined stage, said cam having a track profile adapted to actuate said knockout and ejection means during said traverse, whereby to eject said article from said mold part.

10. A rotary molding machine according to claim 9, wherein said cam is pivotally mounted on said frame.

11. A rotary molding machine according to claim 10, wherein said cam is biased to normal camming position relative to said follower, thereby opposing a knockout force component transmitted by said follower to said cam; and further including a limit switch having an actuator opposing movement of said cam under imposition of said knockout force component, whereby a knockout force component overcoming said bias actuates said cam to trip said switch.

12. A rotary molding machine according to claim 11, wherein said cam is releasably held in camming position by a detent.

13. A rotary molding machine according to claim 12, wherein said cam comprises a plate having a trip arm opposing said actuator in position to trip said switch when said detent releases said cam.

14. A rotary molding machine according to claim 9, wherein said ejection means includes a reciprocable pin arranged for bearing against a portion of said article; said machine further including ejection actuation means bearing upon said pin, and a reciprocable bar opposing said ejector actuation means in position to drive said pin in a direction to eject said article, said follower being affixed to said bar, and said cam track being profiled to drive said bar in a direction to actuate said pin as said follower traverses said track.

15. A rotary molding machine according to claim 14, wherein said bar is yieldably biased to a retracted position, with said follower towards said cam.

16. A rotary molding machine according to claim 15, wherein said track profile includes a rapid advance portion in the traverse of said follower toward the knockout position of said bar, said bar being spaced from said ejection actuation means when said bar is in said retracted position.

17. In a machine for molding plastic articles, said machine having a carrier with drive means and drive stop means therefor, said carrier having a plurality of split molds arranged thereon for successive movement past an article-ejection station, each said mold having first and second parts relatively movable to open and close said mold, and means maintaining said mold in open condition as said mold passes said station, said first mold part being adapted for releasable retention of said article therein as said mold opens and passes said station, article knockout apparatus comprising: ejection means carried by said first mold part in position to mechanically eject said article from said first mold part, impeller means carried with said mold, said impeller means being movably associable with said ejection means to effect ejection of said article; means for alone effecting and controlling ejection movement of said impeller means as said mold passes said station; actuation means associable with said controlling means and affixed to said impeller means to impel said ejection means upon movement of said mold past said station, and safety stop control means associated with said controlling means responsive therewith to predetermined resistance of said ejection means to said ejection movement for actuating said drive stop means, whereby said machine is adapted for automatic ejection of articles as said molds pass said station, independently of opening movements of said mold parts, and for automatic stopping of said machine upon excessive resistance to ejection of any one said article.

References Cited
UNITED STATES PATENTS 3,025,561    3/1962    Ruekberg et al.
3,357,043    12/1967    Doucet.

H. A. KILBY, JR., Primary Examiner